J. V. STRAIT.
Traction-Wheels.

No. 136,677.  Patented March 11, 1873.

Witnesses.
E. H. Richards
Homer Thrall

Inventor
Joel V. Strait

UNITED STATES PATENT OFFICE.

JOEL V. STRAIT, OF LITCHFIELD, OHIO.

IMPROVEMENT IN TRACTION-WHEELS.

Specification forming part of Letters Patent No. 136,677, dated March 11, 1873.

*To all whom it may concern:*

Be it known that I, JOEL V. STRAIT, of Litchfield, in the county of Medina and State of Ohio, have invented a Traction-Wheel, of which the following is a specification:

The nature of my invention consists in the employment of a series of wrist-pins in two separate wheels in connection with a series of half the number of connecting bars or blades, which are connected to the two wheels, by means of the wrist-pins, in such manner as to cause the journals of each wheel to run eccentrically to each other, all being arranged to operate together as a traction-wheel, one or more of which may be used in the construction of a traction-engine, propelled by steam or other motive power, to be used on ordinary roads or fields for transportation or agricultural purposes.

Figure 1:
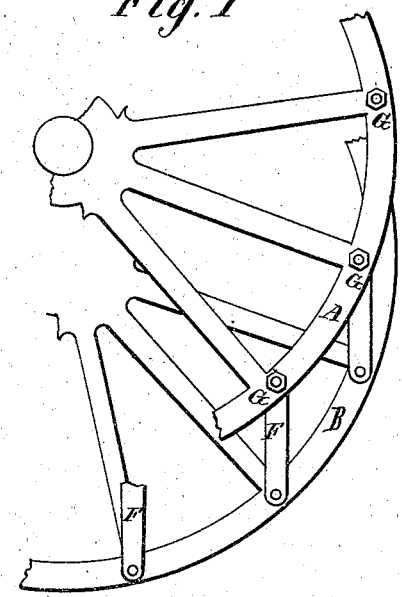
Figure 3:
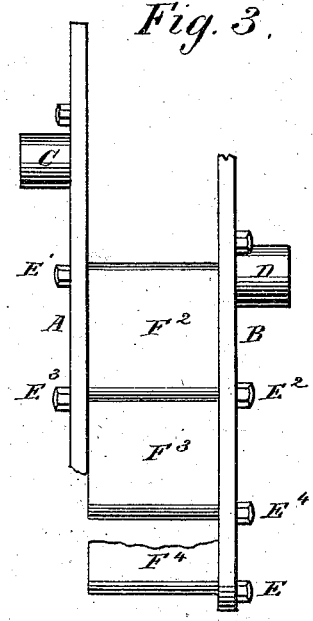
Figure 2:
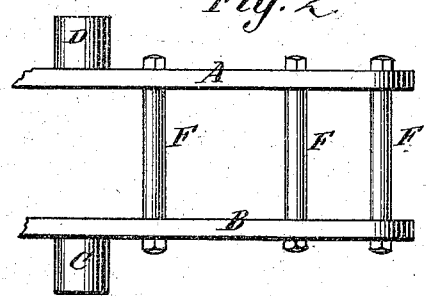
Figure 4:
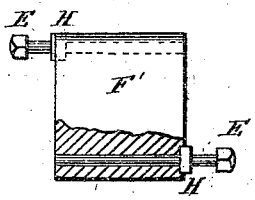

Figure 1 is a side view of sectional parts of wheels A and B, and is also an end view of connecting bars or blades F F. Fig. 2 a plan view of sectional parts of wheels A and B, and is also an edge view of connecting bars or blades F F. Fig. 3 is an edge view of wheels A and B, and is also a side view of connecting bars or blades F F. Fig. 4 is a side view of a detached connecting bar or blade, F, also showing the wrist-pin E E arranged the same as in use.

E, Fig. 4, is a wrist-pin, which may be made of any suitable material and of any desired length and size, and is provided with a fixed collar, H, which is drawn firmly against the inside of the wheel A (or B) and secured by nut G on the opposite side, and may be of any desired length, so that the connecting bar or blade F may be secured upon it in any suitable manner. F F are connecting bars or blades, made of any suitable material, and about the length it is desired to have the wheels A and B set apart, and in width less than the distance between the wrist-pin $E^1$ and $E^3$, Fig. 3, and so made as to admit a part or all of the collar H on wrist-pin E, Fig. 4. The connecting bar or blade $F^2$ in Fig. 3 is connected to wheel A by the wrist-pin $E^1$, passing in and nearly through the top end of the bar $F^2$, and is also connected to the wheel B by means of wrist-pin $E^2$ passing into the connecting-bar $F^2$ near the bottom. Each and all other bars or blades F F are connected to wheels A and B in a like manner. Any desired number of wrist-pins E $E^1$ may be rigidly secured to and in the side of wheel A, Fig. 1, at equal distances apart and from the center. A like number are also secured to wheel B, Fig. 1, the same distances apart and from the center. The two wheels A and B are then connected. All the wrist-pins E $E^1$ on wheel A are put to their proper places near the top of the connecting-bars F F, while all the wrist-pins E $E^1$ on wheel B are put to their proper places in the connecting-bars F F, as described, and shown in Fig. 3. When the journals C and D are arranged on a vertical line, they will stand eccentrically to one another the distance the wrist-pins $E^1$ $E^2$ are apart in the connecting bars or blades F F, which bars will always be moved edgewise on a parallel line with a line drawn from the center of wheel A to the center of wheel B, Fig 1, which line between the centers of wheels A and B may be any desired angle, which will depend on the arrangement of the bearings of the wheels A and B.

By arranging the pinions A and B on a horizontal line the connecting bars or blades are made to run in such manner as to utilize as much bearing-surface as possible to the feet on which the wheels rest, and are caused to tread as they have rotation imparted to them. On the feet F F may be arranged springs or elastic material in such manner as to greatly relieve the other parts from concussion caused by the unevenness of the surface over which the wheels may run.

I claim as my invention—

1. The wrist-pins E $E^1$, rigidly connected to and in the wheels A and B, substantially as shown and set forth.

2. The connecting bars or blades F F, in combination with the wrist-pins E $E^1$ on wheels A and B, substantially as shown and set forth.

3. The construction of the wheels A B, by which the feet F F may be lifted up and set down on a vertical line, substantially in the manner and for the purpose set forth.

JOEL V. STRAIT.

Witnesses:
C. STEBBINS,
JOHN HEATH.